US012128766B2

(12) United States Patent
Iwasawa et al.

(10) Patent No.: US 12,128,766 B2
(45) Date of Patent: Oct. 29, 2024

(54) IN-VEHICLE DISPLAY DEVICE

(71) Applicant: Panasonic Intellectual Property Management Co., Ltd., Osaka (JP)

(72) Inventors: Daiki Iwasawa, Tokyo (JP); Tomohiro Sekiguchi, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 376 days.

(21) Appl. No.: 17/585,231

(22) Filed: Jan. 26, 2022

(65) Prior Publication Data

US 2022/0314795 A1    Oct. 6, 2022

(30) Foreign Application Priority Data

Mar. 30, 2021  (JP) ................. 2021-056579

(51) Int. Cl.
| | | |
|---|---|---|
| *B60K 35/00* | (2024.01) | |
| *B60R 11/02* | (2006.01) | |
| *G02F 1/1333* | (2006.01) | |
| *B60K 35/22* | (2024.01) | |
| *B60R 11/00* | (2006.01) | |

(52) U.S. Cl.
CPC .......... *B60K 35/00* (2013.01); *B60R 11/0235* (2013.01); *G02F 1/1333* (2013.01); *G02F 1/133308* (2013.01); *B60K 35/22* (2024.01); *B60K 2360/691* (2024.01); *B60R 2011/0005* (2013.01); *B60R 2011/0052* (2013.01)

(58) Field of Classification Search
CPC .. B60K 35/00; B60K 2360/691; B60K 35/22; B60R 11/0235; B60R 2011/0005; B60R 2011/0052; G02F 1/1333; G02F 1/133308

USPC ......................................... 348/837
See application file for complete search history.

(56) References Cited

U.S. PATENT DOCUMENTS

| | | | |
|---|---|---|---|
| 2007/0199028 A1* | 8/2007 | Yau ............ | B60K 35/00 725/77 |
| 2011/0019123 A1 | 1/2011 | Prest et al. | |
| 2011/0019354 A1 | 1/2011 | Prest et al. | |
| 2012/0236388 A1 | 9/2012 | De Wind et al. | |
| 2015/0116919 A1 | 4/2015 | Prest et al. | |

(Continued)

FOREIGN PATENT DOCUMENTS

| | | |
|---|---|---|
| CN | 108600456 A | 9/2018 |
| JP | 2012-519344 A | 8/2012 |

(Continued)

OTHER PUBLICATIONS

Office Action, Notice of Reasons for Refusal, dated Jul. 1, 2024, for Japanese Patent Application No. 2021056579. (6 pages) (with English Machine Translation).

*Primary Examiner* — Stuart D Bennett
*Assistant Examiner* — Anthony Michael Terry
(74) *Attorney, Agent, or Firm* — Seed IP Law Group LLP

(57) ABSTRACT

An in-vehicle display device according to the present disclosure includes a front plate and a housing. In the front plate, a first arc surface bulging outward is formed on a front surface side in an outer peripheral edge portion. The housing supports the front plate from a rear surface side. In the housing, a second arc surface bulging outward is formed on a side surface side, and a part on the side surface side protrudes toward the front surface side from a rear surface of the front plate, and faces the outer peripheral edge portion of the front plate.

9 Claims, 4 Drawing Sheets

(56) References Cited

U.S. PATENT DOCUMENTS

| | | | |
|---|---|---|---|
| 2016/0264054 A1* | 9/2016 | Uken | B60R 1/088 |
| 2019/0299864 A1* | 10/2019 | Kitajima | B60R 11/04 |
| 2020/0014781 A1 | 1/2020 | Lee et al. | |
| 2021/0168230 A1* | 6/2021 | Baker | G06F 1/1698 |

FOREIGN PATENT DOCUMENTS

| | | | | |
|---|---|---|---|---|
| JP | 2019130971 | * | 1/2018 | B60K 35/00 |
| JP | 2019516123 A | | 6/2019 | |
| JP | 2019-172147 A | | 10/2019 | |
| JP | 2020052295 A | | 4/2020 | |

* cited by examiner

IN-VEHICLE DISPLAY DEVICE

CROSS-REFERENCE TO RELATED APPLICATIONS

This application is based upon and claims the benefit of priority from Japanese Patent Application No. 2021-056579, filed on Mar. 30, 2021, the entire contents of which are incorporated herein by reference.

FIELD

The present disclosure relates to an in-vehicle display device.

BACKGROUND

In the related art, an in-vehicle display device that displays an image and a video for an occupant in a rear seat of a vehicle has been known. A glass plate may be used as a display surface of the in-vehicle display device, that is, a front plate provided on the outermost surface on the occupant side. See JP 2012-519344A, for example In the above-described in-vehicle display device, it is required to provide R5, that is, an arc shape having a radius of 5 mm or more on a product outer shape from legal requirements. In addition, for example, for the purpose of suppressing plate cracking of the front plate from the viewpoint of rear collision safety, a protective member that protects an end surface of the front plate may be provided. Since these requirements cause restrictions on the product outer shape of the in-vehicle display device, the degree of freedom in design may be impaired such as an increase in a frame width that does not contribute to display.

The present disclosure provides an in-vehicle display device that can improve the degree of freedom in design.

SUMMARY

An in-vehicle display device according to the present disclosure includes a front plate and a housing. In the front plate, a first arc surface bulging outward is formed on a front surface side in an outer peripheral edge portion. The housing supports the front plate from a rear surface side. In the housing, a second arc surface bulging outward is formed on a side surface side, and a part on the side surface side protrudes toward the front surface side from a rear surface of the front plate, and faces the outer peripheral edge portion of the front plate.

DETAILED DESCRIPTION

Figure 1:
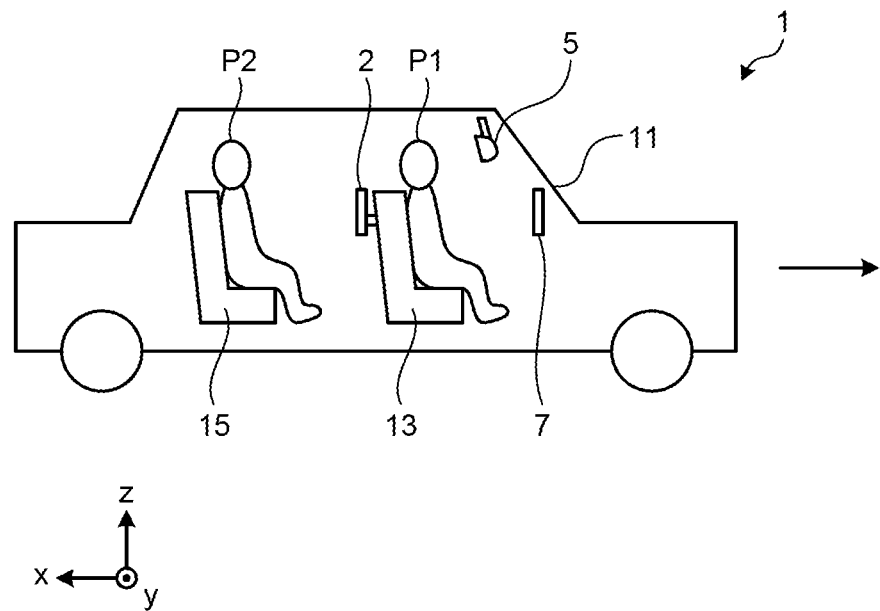
FIG. 1 is a diagram schematically illustrating an example of a configuration of a vehicle according to an embodiment.

Hereinafter, an embodiment of an in-vehicle display device according to the present disclosure will be described with reference to the drawings. In the present embodiment, an in-vehicle display device that displays an image and a video for an occupant in a rear seat of a vehicle such as an automobile is exemplified.

In the following description, components having the same or substantially the same functions as those described above in the previous drawings are denoted by the same reference numerals, and the description thereof may be appropriately omitted. In addition, even in the case of representing the same or substantially the same portion, the dimensions and ratios may be represented differently from each other depending on the drawings. Furthermore, for example, from the viewpoint of ensuring visibility of the drawings, in the description of each drawing, only main components are denoted by reference numerals, and even components having the same or substantially the same functions as those described above in the previous drawings may not be denoted by reference numerals.

Note that, in the following description, "same" and "common" include not only completely same and common, but also cases of being deviated from being the same and common within a range of error. In addition, "substantially" means the same in an approximate range.

First Embodiment

FIG. 1 is a diagram schematically illustrating an example of a configuration of a vehicle 1 according to an embodiment. In the example illustrated in FIG. 1, a front-rear direction of the vehicle 1 extends in an x-axis direction. Here, it is assumed that a front side of the vehicle 1 is a side in a negative direction of the x-axis direction (hereinafter, described as an x− direction) of the vehicle 1. It is assumed that a rear side of the vehicle 1 is a side in a positive direction of the x-axis direction (hereinafter, described as an x+ direction). A left-right direction of the vehicle 1 extends in a y-axis direction. Here, it is assumed that a right side of the vehicle 1 is a side in a positive direction of the y-axis direction (hereinafter, described as a y+ direction) of the vehicle 1. It is assumed that a left side of the vehicle 1 is a side in a negative direction of the y-axis direction (hereinafter, described as a y− direction). Note that the left and right sides of the vehicle 1 may be collectively referred to as sides. An up-down direction of the vehicle 1 extends in a z-axis direction. Here, it is assumed that an upper side of the vehicle 1 is a side in a positive direction of the z-axis direction (hereinafter, described as a z+ direction) of the vehicle 1. It is assumed that a lower side of the vehicle 1 is a side in a negative direction of the z-axis direction (hereinafter, described as a z− direction).

As illustrated in FIG. 1, the vehicle 1 is provided with a windshield 11, a front seat 13, a rear seat 15, and an in-vehicle display device 2. The front seat 13 is provided on the front side of the vehicle 1, and an occupant P1 is seated on the front seat 13. The occupant P1 is, for example, a driver. The front seat 13 includes a driver seat or a passenger seat. The windshield 11 is provided at a position facing the occupant P1 seated on the front seat 13. The rear seat 15 is provided behind the front seat 13, and an occupant P2 different from the occupant P1 is seated on the rear seat 15. The in-vehicle display device 2 is provided behind the front seat 13, more specifically, on a back surface of the front seat 13. The display surface of the in-vehicle display device 2 faces the occupant P2 seated on the rear seat 15.

In the present embodiment, for the sake of simplicity of description, it is assumed that a front surface and a rear surface of the in-vehicle display device 2 are surfaces parallel to the y-z plane. It is assumed that a direction from the rear surface to the front surface of the in-vehicle display device 2 is the x+ direction. That is, in the following description, the front surface side means a side in the x+ direction. Similarly, the rear surface side means a side in the x− direction. Here, the display surface of the in-vehicle display device 2 is provided on the front surface side. Therefore, the front surface of the in-vehicle display device 2 may be referred to as the display surface. In addition, the rear surface of the in-vehicle display device 2 may be referred to as a back surface.

Note that the configuration of the in-vehicle display device 2 according to each embodiment described below is an example, and is not limited to the following description. For example, the technology according to the present embodiment can be applied to an in-vehicle display device 5 as a rear-view mirror device for the occupant P1 on the front seat 13 such as the driver seat and the passenger seat, and an in-vehicle display device 7 as a navigation device. The in-vehicle display device 5 is disposed on the upper side of the windshield 11, for example. The in-vehicle display device 7 is disposed on the lower side of the windshield 11, for example. The display surface of the in-vehicle display device 5 and the display surface of the in-vehicle display device 7 face the occupant P1 on the front seat 13.

Figure 2:
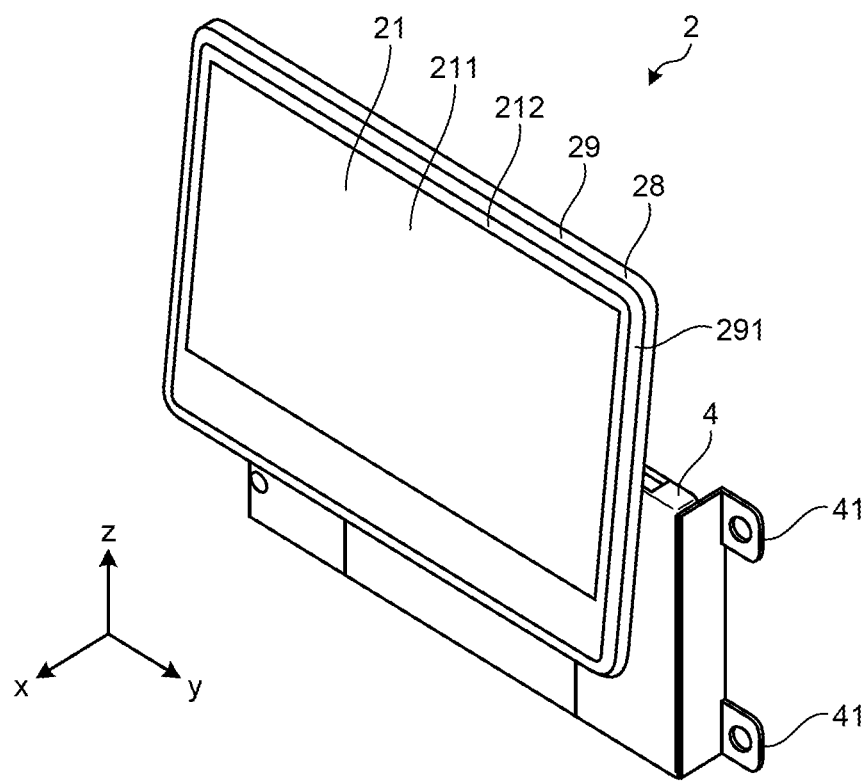
FIG. 2 is a perspective view illustrating an example of an external appearance of an in-vehicle display device according to the embodiment.
Figure 3:
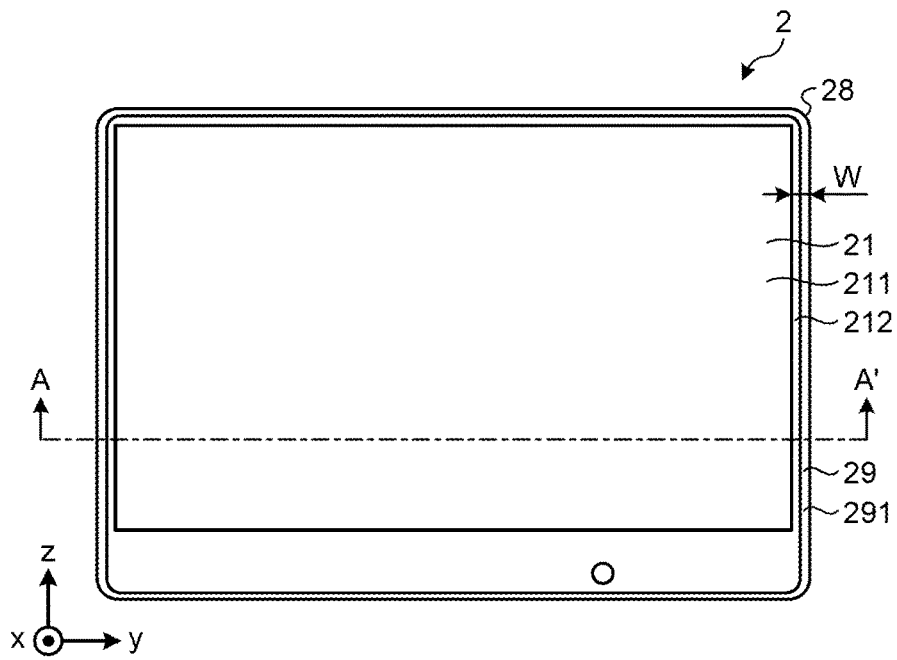
FIG. 3 is a front view illustrating an example of the external appearance of the in-vehicle display device according to the embodiment.

FIG. 2 is a perspective view illustrating an example of an external appearance of the in-vehicle display device 2 according to the embodiment. FIG. 3 is a front view illustrating an example of the external appearance of the in-vehicle display device 2 according to the embodiment. As illustrated in FIGS. 2 and 3, the in-vehicle display device 2 includes a front plate 21 and a housing 28. As illustrated in FIG. 2, a housing 4 is provided on the back surface side of the in-vehicle display device 2. When a connection portion 41 of the housing 4 is fastened to the back surface of the front seat 13 by using bolts or the like, the in-vehicle display device 2 is attached to the vehicle 1. The housing 28 of the in-vehicle display device 2 is rotatably connected to the housing 4. The housing 28 is connected to the housing 4 so as to be rotatable about a rotation axis in the z-axis direction, for example, and the display surface of the in-vehicle display device 2 can be inclined in the left-right direction, that is, can be swung. The housing 28 is connected to the housing 4 so as to be rotatable about a rotation axis in the y-axis direction, for example, and the display surface of the in-vehicle display device 2 can be inclined in the up-down direction. The housing 28 is connected to the housing 4 so as to be rotatable about a rotation axis in the x-axis direction, for example, and the display surface of the in-vehicle display device 2 can be inclined upward to the left or upward to the right.

The mode of the connection between the housing 28 and the housing 4 or the connection between the housing 4 and the back surface of the front seat 13 is not limited to the above-described example, and can be arbitrarily designed. For example, the housing 28 and the housing 4 may be integrally configured. In this case, the housing 28 may be fixed to the housing 4. For example, the housing 4 may be fastened to a center console portion provided in the front seat 13, a ceiling portion of the vehicle 1, a B-pillar portion of the vehicle 1, an armrest portion of the rear seat 15, or the like without being limited to the back surface of the front seat 13. Note that the shape of the housing 4 can be arbitrarily designed, for example, in a case where the housing 4 is fastened to a portion other than the back surface of the front seat 13.

Figure 4:
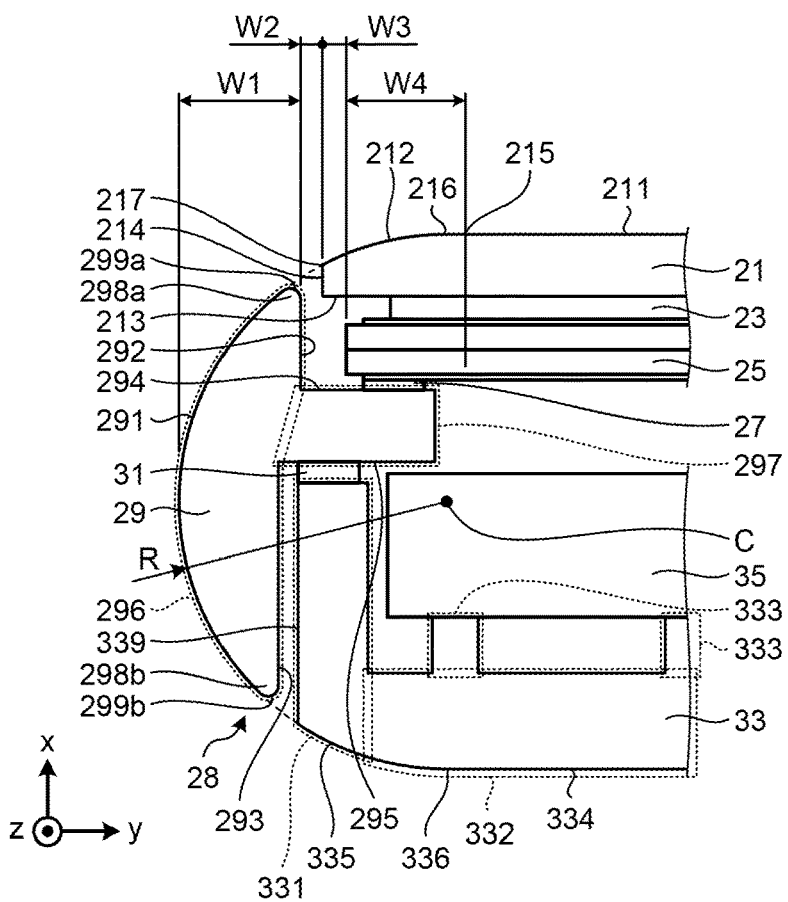
FIG. 4 is a partial sectional view illustrating an example of a configuration of the in-vehicle display device according to the embodiment.

FIG. 4 is a partial sectional view illustrating an example of a configuration of the in-vehicle display device 2 according to the embodiment. FIG. 4 illustrates a partial sectional view taken along line A-A' of FIG. 3.

As illustrated in FIG. 4, the front plate 21 is provided on the front surface side of the in-vehicle display device 2. That is, a front surface 211 of the front plate 21 forms the display surface of the in-vehicle display device 2. The front plate 21 is a plate-like member formed of glass, for example. The front plate 21 may be formed of a resin material such as polycarbonate or acrylic resin without being limited to glass.

In the front plate 21, a first arc surface 212 bulging outward is formed on the front surface side in the outer peripheral edge portion. Here, the arc surface bulging outward is a surface having an arc shape curved outward. Further, the expression "curved outward" means "convex outward". The first arc surface 212 of the front plate 21 is provided on a side surface side of a video display range in the front plate 21. Here, the video display range is a range in the front plate 21 where a video displayed on a cell 25 to be described later can be visually recognized through the front plate 21. Specifically, an inner end portion 216 of the first arc surface 212 is provided outside an end portion 215 of the video display range. An outer end portion 217 of the first arc surface 212 is a boundary portion between the front surface 211 of the front plate 21 and an end surface 214 on the side surface side of the front plate 21.

The cell 25 is bonded to a rear surface 213 of the front plate 21 via an adhesive layer 23. As the adhesive layer 23, for example, an optical clear adhesive (OCA) which is a film-like optical adhesive sheet is used, but an optical clear resin (OCR) may be used. The cell 25 is configured as, for example, an in-cell touch panel. The cell 25 may be configured as, for example, an out-cell touch panel.

The housing 28 has a front panel 29 and a rear panel 33.

The front panel 29 is provided, for example, along the outer peripheral edge portion of the front plate 21 as a side surface component of the housing 28. The front panel 29 is formed of, for example, a resin material. The front panel 29 has a high degree of freedom in painting, surface processing, shape, and the like, and can provide a design added value to the in-vehicle display device 2. As the surface processing, texturing, embossing, matte processing, and the like can be appropriately used. For example, in the front plate 21 formed of glass, the end surface 214 on the side surface side has relatively low strength. Therefore, by providing the front panel 29 of which a tip portion 298a on the front surface side is disposed at a position facing the end surface 214 on the side surface side of the front plate 21, it is possible to reduce the possibility that the front plate 21 is broken at the time of collision or the like. As a result, the safety of the in-vehicle display device 2 can be ensured even at the time of collision or the like. In addition, the front panel 29 also functions as a cover that covers the inside of the housing 28 so that the inside of the housing 28 is not visible. The front panel 29 includes a main body portion 296 and a support portion 297. The main body portion 296 and the support portion 297 are integrally formed, for example.

A second arc surface 291 is formed in the main body portion 296. The shape of the main body portion 296 corresponds to a part of a cylinder cut substantially perpendicular to the bottom surface. Specifically, the sectional shape of the main body portion 296, that is, the bottom surface of the column corresponding to a part of the cylinder is defined by the arc of the second arc surface 291 on the outer side and strings of a side surface 292 and a side surface 293 on the inner side, as illustrated in FIG. 4. Note that the side surface 292 and the side surface 293 on the inner side may be provided on the same straight line, or may have different distances from the second arc surface 291 as illustrated in FIG. 4.

The tip portion 298a on the front surface side of the main body portion 296 protrudes toward the front surface side from the rear surface 213 of the front plate 21, and faces the outer peripheral edge portion of the front plate 21. Here, the tip portion 298a on the front surface side and the outer peripheral edge portion of the front plate 21 are disposed apart from each other. A gap between the tip portion 298a on the front surface side and the outer peripheral edge portion of the front plate 21 is, for example, 10 mm or less. A third arc surface 299a bulging outward is formed in the tip portion 298a on the front surface side.

A tip portion 298b on the rear surface side of the main body portion 296 faces the outer peripheral edge portion of the rear panel 33. Here, the tip portion 298b on the rear surface side and the outer peripheral edge portion of the rear panel 33 are disposed apart from each other. A gap between the tip portion 298b on the rear surface side and the outer peripheral edge portion of the rear panel 33 is, for example, 10 mm or less. A fifth arc surface 299b bulging outward is formed in the tip portion 298b on the rear surface side.

The curvature of the third arc surface 299a provided at the tip portion 298a on the front surface side of the main body portion 296 and the curvature of the fifth arc surface 299b provided at the tip portion 298b on the rear surface side may be the same or different. The curvatures of the third arc surface 299a and the fifth arc surface 299b are smaller than the curvatures of the first arc surface 212, the second arc surface 291, or a fourth arc surface 335, for example. The curvatures of the third arc surface 299a and the fifth arc surface 299b may be arbitrarily set according to the legal requirements. Each of the third arc surface 299a and the fifth arc surface 299b has, for example, an arc shape having a radius of 0.25 mm or more. Preferably, each of the third arc surface 299a and the fifth arc surface 299b has, for example, an arc shape having a radius of 0.3 mm.

The support portion 297 extends opposite to the second arc surface 291 from the main body portion 296. In other words, the support portion 297 extends from a portion between the side surface 292 and the side surface 293 on the inner side of the front panel 29. The support portion 297 has, for example, a quadrangular prism shape extending along the outer peripheral edge portion of the front plate 21. The tip portion of the support portion 297 is positioned on the side surface side of the video display range in the front plate 21. A front surface 294 of the support portion 297 supports the front plate 21 from the rear surface side. Specifically, the front surface 294 of the support portion 297 is joined to the cell 25 by an adhesive layer 27. A rear surface 295 of the support portion 297 is joined to the rear panel 33 by an adhesive layer 31. As the adhesive layer 27 and the adhesive layer 31, any adhesive sheet or adhesive material can be appropriately used.

The rear panel 33 is provided as a rear surface component of the housing 28. The rear panel 33 supports the front panel 29 from the rear surface side. The fourth arc surface 335 bulging outward is formed on the outer peripheral edge portion of a rear surface 334 of the rear panel 33. The fourth arc surface 335 is provided from an inner end portion 336 to a boundary portion between the rear surface 334 and a side surface 339. The inner end portion 336 is, for example, at a position corresponding to the inner end portion 216 of the first arc surface 212. Here, the position corresponding to the inner end portion 216 of the first arc surface 212 is, for example, a position at the same distance from the outermost peripheral portion of the front panel 29 or the same position in the y-axis direction. Note that the inner end portion 216 of the first arc surface 212 and the inner end portion 336 of the fourth arc surface 335 may be at different positions in the y-axis direction. The rear panel 33 is formed of, for example, an alloy material. The rear panel 33 is formed of, for example, a magnesium alloy material or an aluminum alloy. The rear panel 33 may be formed of, for example, a resin material.

The rear panel 33 is provided with a side surface portion 331, a main body portion 332, and a protrusion 333. The side surface portion 331 is provided on the outer peripheral edge portion of the rear panel 33, and extends from the main body portion 332 toward the front surface side. The side surface portion 331 has, for example, a quadrangular prism shape extending along the outer peripheral edge portion of the front plate 21. The end on the front surface side of the side surface portion 331 is joined to the rear surface 295 of the support portion 297 provided on the front panel 29 by the adhesive layer 31. The side surface 339 of the side surface portion 331 faces the side surface 293 on the inner side of the front panel 29. The main body portion 332 is provided on the rear surface side of the rear panel 33, and has a substantially flat plate shape. The fourth arc surface 335 is formed on the outer peripheral edge portion of the rear surface 334 of the main body portion 332. The protrusion 333 is provided on the inner side of the rear panel 33, and extends from the main body portion 332 toward the front surface side. The protrusion 333 has, for example, a cylinder shape or a polygonal columnar shape extending from the main body portion 332 toward the front surface side. The protrusion 333 supports an optical component 35 provided in the housing 28.

As described above, the front panel 29 as the side surface component of the housing 28 supports the front plate 21, to which the cell 25 is joined, from the rear surface side by the front surface 294 of the support portion 297. In other words, the housing 28 supports the front plate 21 and the cell 25 from the rear surface side. The front panel 29 is provided along the outer peripheral edge portion of the front plate 21 such that the second arc surface 291, which is formed on the main body portion 296 and bulges outward, constitutes a side portion of the housing 28. In other words, the second arc surface 291 bulging outward is formed on the side surface side of the housing 28.

In addition, in the in-vehicle display device 2, the tip portion 298a on the front surface side of the front panel 29 protrudes toward the front surface side from the rear surface 213 of the front plate 21, and faces the outer peripheral edge portion of the front plate 21. The third arc surface 299a bulging outward is formed in the tip portion 298a on the front surface side of the front panel 29. In other words, a part on the side surface side in the housing 28 protrudes toward the front surface side from the rear surface 213 of the front plate 21, and faces the outer peripheral edge portion of the front plate 21. The third arc surface 299a bulging outward is formed on the corresponding part on the front surface side of the front plate 21.

The rear panel 33 as the rear surface component of the housing 28 is provided on the rear surface side of the housing 28 such that the fourth arc surface 335, which is formed on the outer peripheral edge portion of the rear surface 334 and bulges outward, constitutes the outer peripheral edge portion of the rear surface of the housing 28. In other words, the fourth arc surface 335 bulging outward is formed on the rear surface side in the outer peripheral edge portion of the housing 28.

In a case where an adhesive layer such as a double-sided tape is provided on the side surface 339, the front panel 29 may be joined to the side surface 339 of the rear panel 33 before the front panel 29 and the rear panel 33 are joined by the adhesive layer 31 on the upper surface at the time of assembly. That is, in a case where an adhesive layer such as a double-sided tape is provided on the side surface 339, there is a possibility that the front panel 29 and the rear panel 33 cannot be adhered at a normal position. Therefore, in the in-vehicle display device 2 according to the embodiment, no adhesive layer is provided between the side surface 339 of the side surface portion 331 and the side surface 293 on the inner side of the front panel 29.

When the in-vehicle display device 2 is assembled, a substrate such as a TFT substrate is installed on the rear surface side of the optical component 35. Wiring from the cell 25 and wiring of the optical component 35 are connected to the substrate provided on the rear surface side of the optical component 35. For this reason, in the case of a component in which the front panel 29 and the rear panel 33 are integrally formed, assemblability may be deteriorated, and the cycle time of mass production may be affected. Therefore, in the in-vehicle display device 2 according to the embodiment, the front panel 29 and the rear panel 33 are formed as separate components. Further, by forming the front panel 29 and the rear panel 33 as separate components, for example, it is easy to paint the front panel 29 and the rear panel 33 in different colors from the viewpoint of design. Similarly, it is easy to change heat dissipation, strength, and surface design between the front panel 29 and the rear panel 33. As described above, by forming the front panel 29 and the rear panel 33 as separate components, the degree of freedom in design can be improved.

Of course, the front panel 29 and the rear panel 33 may be integrally formed. In this case, it is possible to reduce the number of components although the degree of freedom in design is reduced as compared with the case of being formed as separate components, and it is possible to suppress the occurrence of variations at the time of assembly.

In the in-vehicle display device 2 according to the embodiment, each of the first arc surface 212 provided on the front plate 21 and the second arc surface 291 provided on the front panel 29 of the housing 28 is a part of a common arc surface. Each of the second arc surface 291 provided on the front panel 29 and the fourth arc surface 335 provided on the rear panel 33 is a part of a common arc surface. Therefore, in the in-vehicle display device 2 according to the present embodiment, the first arc surface 212, the second arc surface 291, and the fourth arc surface 335 are a part of a common arc surface. Here, the common arc surface means that, for example, the center C of the arc and the radius R of the arc are common. Alternatively, the first arc surface 212, the second arc surface 291, and the fourth arc surface 335 are set to be tangent continuous. That is, the in-vehicle display device 2 according to the embodiment has a shape in which the outer peripheral edge portion is rounded as a whole.

The curvatures of the first arc surface 212, the second arc surface 291, and the fourth arc surface 335 may be arbitrarily set according to the legal requirements. The first arc surface 212, the second arc surface 291, and the fourth arc surface 335 have, for example, an arc shape having a radius R of 5 mm or more, that is, R5 or more. Preferably, the first arc surface 212, the second arc surface 291, and the fourth arc surface 335 have, for example, an arc shape having a radius R of 5.5 mm.

The first arc surface 212, the second arc surface 291, and the fourth arc surface 335 may not be a part of the common arc surface. For example, the curvatures of the first arc surface 212 and the second arc surface 291 may be different from each other. In this case, regarding the arc in which the first arc surface 212 and the second arc surface 291 are inscribed, the curvature may be arbitrarily set according to the legal requirements similarly to the common arc surface described above. For example, the curvatures of the second arc surface 291 and the fourth arc surface 335 may be different from each other. In this case, regarding the arc in which the second arc surface 291 and the fourth arc surface 335 are inscribed, the curvature may be arbitrarily set according to the legal requirements similarly to the common arc surface described above.

For example, when the first arc surface 212 and the second arc surface 291 are a part of a common arc, the common arc coincides with the arc in which the first arc surface 212 and the second arc surface 291 are inscribed. Similarly, for example, when the second arc surface 291 and the fourth arc surface 335 are part of a common arc, the common arc coincides with the arc in which the second arc surface 291 and the fourth arc surface 335 are inscribed.

In the in-vehicle display device 2, an image or a video is displayed at the central portion of the front plate 21 on the basis of light from the cell 25 and the optical component 35. Therefore, a portion from the end portion 215 of the video display range on the front plate 21 to the outer peripheral edge portion of the housing 28 is a region called a frame where no image or video is displayed. As illustrated in FIG. 4, a frame width W is defined by a sum of a width W1, a width W2, a width W3, and a width W4. The width W1 is a width of the front panel 29 from the side surface 292. The width W2 is a width between the end surface 214 of the front plate 21 and the side surface 292 of the front panel 29. The width W3 is a width between the end surface 214 of the front plate 21 and the end surface on the side surface side of the cell 25. The width W4 is a width from the end surface of the cell 25 to the end portion 215 of the video display range.

In the in-vehicle display device 2 for an occupant on the rear seat, it is necessary to provide an arc shape of R5 or more in the outer shape of the in-vehicle display device 2 according to the legal requirements. In addition, in order to suppress the cracking of the front plate 21 at the time of rear collision or the like, for the purpose of protecting the end surface 214 of the front plate 21, a part of the housing 28, for example, the tip portion 298a on the front surface side of the front panel 29 may be provided on the outer side of the front plate 21.

If it is intended to realize that the entire outer shape of the in-vehicle display device 2 is R5 or more only by providing an arc shape in the housing 28 such as the front panel 29, the width W1 of the front panel 29 is 5 mm or more. Therefore, in a case where the entire outer shape of the in-vehicle display device 2 is R5 or more only by providing the arc shape in the housing 28 such as the front panel 29, the frame width W is increased according to the width W1, and thus it is difficult to narrow the frame.

On the other hand, in a case where it is intended to realize that the entire outer shape of the in-vehicle display device 2 is R5 or more only by providing an arc shape in the outer peripheral edge portion of the front plate 21, a part of the housing 28 such as the tip portion 298a on the front surface side of the front panel 29 is not provided on the outer side of the end surface 214 of the front plate 21. Therefore, it is difficult to reduce the possibility of cracking of the front plate 21 at the time of rear collision or the like.

Under such circumstances, in the in-vehicle display device 2 according to the embodiment, as illustrated in FIG. 4, an arc shapes having the same radius is provided to be tangent continuous between the outer peripheral edge portion of the front plate 21 and the housing 28. Consequently, the frame width W can be reduced by reducing the width W1 of the front panel 29 as compared with the case in which the arc shape is provided to only one of the front plate 21 and the front panel 29.

Figure 5:
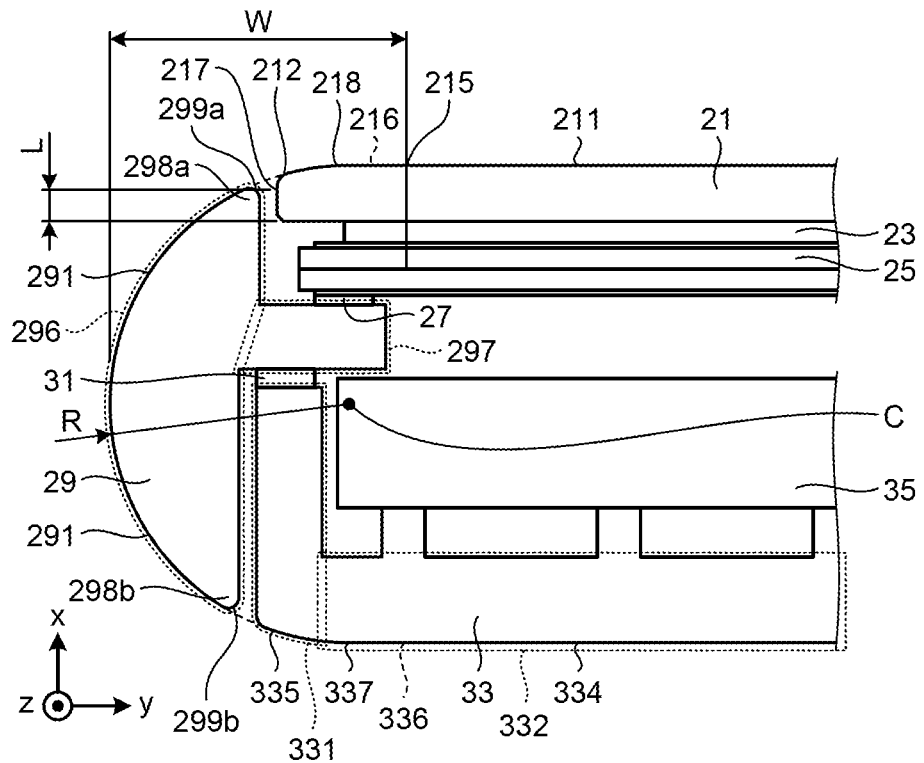
FIG. 5 is a diagram for describing an arc shape of the in-vehicle display device according to the embodiment.
Figure 6:
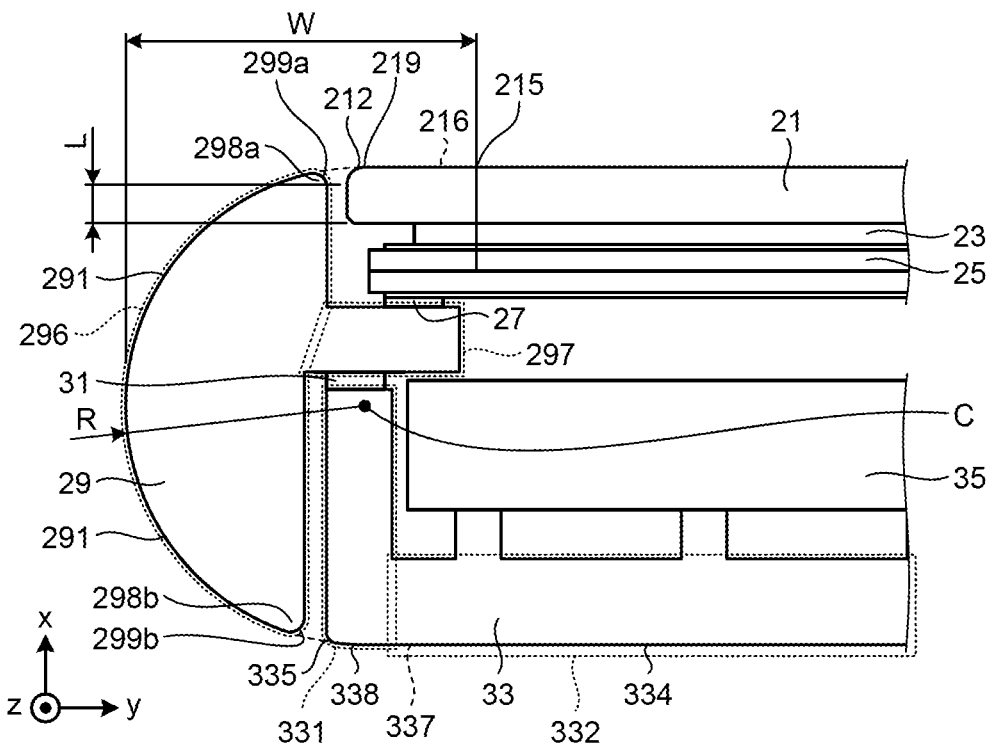
FIG. 6 is a diagram for describing the arc shape of the in-vehicle display device according to the embodiment.

FIGS. 5 and 6 are diagrams for describing the arc shape of the in-vehicle display device 2 according to the embodiment.

For example, in the configuration of FIG. 4, even in a case where the arc shape of R5.5 is provided, the frame width W can be suppressed to about 6 mm. In the configuration of FIG. 4, when the inner end portion 216 of the first arc surface 212 of the front plate 21 and the end portion 215 of the video display range coincide with each other, the highest effect of narrowing the frame can be obtained without affecting the video display due to the provision of the arc shape. That is, the frame width W can be reduced as the start position of the arc shape of the front plate 21 is moved toward the inner side of the front surface 211 of the front plate 21.

On the other hand, a thickness L of the end surface 214 of the front plate 21 is decreased as the start position of the arc shape of the front plate 21 is moved toward the inner side of the front surface 211 of the front plate 21. When the thickness L of the end surface 214 of the front plate 21 is decreased, the front plate 21 is easily cracked. For example, in the configuration of FIG. 4, the thickness L of the end surface 214 of the front plate 21 is about 0.6 mm.

Therefore, for example, as illustrated in FIG. 5, an inner end portion 218 of the first arc surface 212 of the front plate 21 can be provided on the outer side of the end portion 216 in the configuration of FIG. 4. In this case, an inner end portion 337 of the fourth arc surface 335 of the rear panel 33 can also be provided on the outer side of the end portion 336 in the configuration of FIG. 4. Accordingly, even in the case of providing the arc shape of R5.5 similarly to the configuration of FIG. 4, the thickness L of the end surface 214 of the front plate 21 can be made larger than the configuration of FIG. 4. For example, in the configuration of FIG. 5, the thickness L of the end surface 214 of the front plate 21 can be set to about 0.75 mm.

Further, for example, as illustrated in FIG. 6, an inner end portion 219 of the first arc surface 212 of the front plate 21 can be provided on the outer side of the end portion 216 and the end portion 218 in the configurations of FIGS. 4 and 5. In this case, an inner end portion 338 of the fourth arc surface 335 of the rear panel 33 can also be provided on the outer side of the end portion 336 and the end portion 337 in the configurations of FIGS. 4 and 5. Accordingly, even in the case of providing the arc shape of R5.5 similarly to the configurations of FIGS. 4 and 5, the thickness L of the end surface 214 of the front plate 21 can be made larger than the configurations of FIGS. 4 and 5. For example, in the configuration of FIG. 6, the thickness L of the end surface 214 of the front plate 21 can be set to about 0.9 mm.

However, in the configurations of FIGS. 5 and 6, the width W1 of the front panel 29 is larger than that of the configuration of FIG. 4 because the start position of the arc shape in the front plate 21 is moved outward compared to the configuration of FIG. 4. That is, the frame width W in the configurations of FIGS. 5 and 6 is larger than the frame width W in the configuration of FIG. 4. For example, in the configuration of FIG. 5, the frame width W is about 6.9 mm. For example, in the configuration of FIG. 6, the frame width W is about 7.9 mm.

As described above, there is a trade-off relationship between maintaining the strength of the end surface 214 of the front plate 21 and narrowing the frame. Therefore, in the in-vehicle display device 2 according to the embodiment, as illustrated in FIGS. 4 to 6, narrowing the frame in a range in which the strength of the end surface 214 of the front plate 21 can be maintained is realized. Each value of the radius R, the frame width W, and the thickness L described above with reference to FIGS. 4 to 6 is an example, is not limited to the numerical value described above.

Further, in the in-vehicle display device 2, for example, due to the variation in component dimensions of the front panel 29 and the variation at the time of assembling the in-vehicle display device 2, the tip portion 298a on the front surface side of the front panel 29 may protrude to the front surface side of the front plate 21. Similarly, the tip portion 298b on the rear surface side of the front panel 29 may protrude to the rear surface side of the rear panel 33. Therefore, in the in-vehicle display device 2 according to the embodiment, as illustrated in FIGS. 4 to 6, the third arc surface 299a bulging outward is formed in the tip portion 298a on the front surface side of the front panel 29. Similarly, the fifth arc surface 299b bulging outward is formed in the tip portion 298b on the rear surface side of the front panel 29. Each of the third arc surface 299a and the fifth arc surface 299b has, for example, an arc shape having a radius of 0.25 mm or more. Preferably, each of the third arc surface 299a and the fifth arc surface 299b has, for example, an arc shape having a radius of 0.3 mm. As a result, even in a case where at least one of the tip portion 298a on the front surface side and the tip portion 298b on the rear surface side of the front panel 29 protrudes from the outer shape of R5 or more of the in-vehicle display device 2 due to the variation in the component dimension or the variation at the time of assembly, when the gap between the components is 10 mm or less, it is possible to satisfy the legal requirements that the corresponding portion is R0.25 or more.

First Modification

Figure 7:
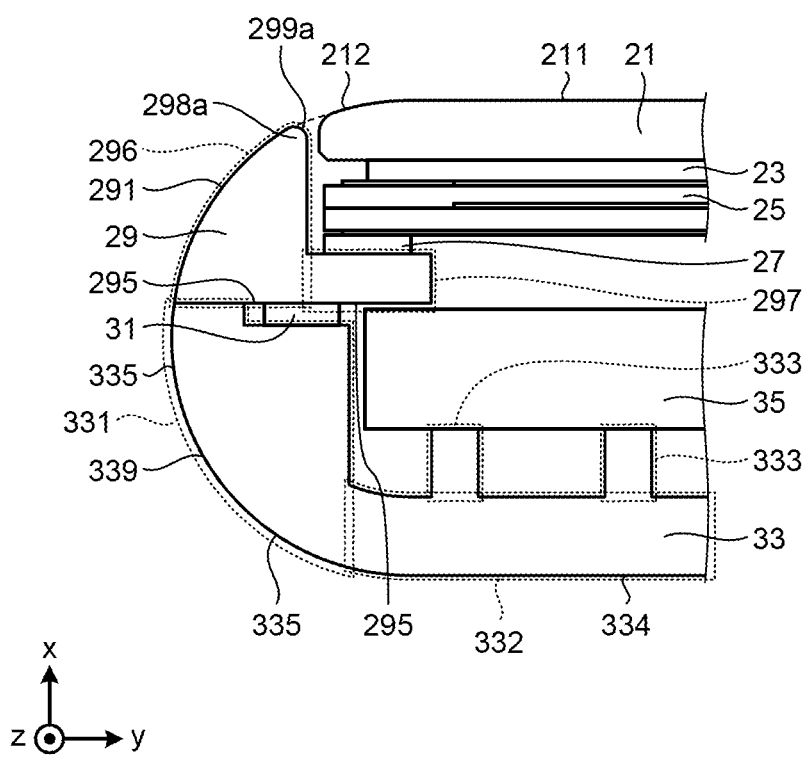
FIG. 7 is a partial sectional view illustrating another example of the configuration of the in-vehicle display device according to the embodiment.

The housing 28 only needs to have an arc shape to be tangent continuous with the front plate 21, and the configuration of the in-vehicle display device 2 is not limited to the configuration illustrated in FIG. 4 and the like. FIG. 7 is a partial sectional view illustrating another example of the configuration of the in-vehicle display device 2 according to the embodiment.

As illustrated in FIG. 7, the rear panel 33 may extend to the side surface side of the in-vehicle display device 2. That is, the rear panel 33 of FIG. 7 has a shape including a part of the front panel 29 of FIG. 4. In other words, in the rear panel 33 of FIG. 7, the fourth arc surface 335 is provided on the side surface 339 of the rear panel 33.

As illustrated in FIG. 7, in the front panel 29, the rear surface of the main body portion 296 is a surface common to the rear surface 295 of the support portion 297. Therefore, unlike the main body portion 296 of FIG. 4, the main body portion 296 of FIG. 7 is not provided with the tip portion 298b on the rear surface side.

In the configuration of FIG. 7, the end portion of the second arc surface 291 of the main body portion 296 and the end portion of the fourth arc surface 335 of the rear panel 33 may be in contact with each other. Alternatively, each of the end portion of the second arc surface 291 of the main body portion 296 and the end portion of the fourth arc surface 335 of the rear panel 33 may be provided with an arc surface of R0.25 or more, for example, R0.3, which bulges outward.

Even with this configuration, the same effects as those of the above-described embodiment can be obtained.

As described above, in the in-vehicle display device 2 according to the embodiment, the first arc surface 212 is provided on the front surface side of the outer peripheral edge portion of the front plate 21. The second arc surface 291 is provided on the side surface of the housing 28 that supports the front plate 21 from the rear surface side.

According to this configuration, it is possible to realize narrowing the frame while satisfying the legal requirements regarding the outer shape of a display device mounted on a vehicle. Therefore, it is possible to improve the degree of freedom in design while satisfying the legal requirements regarding the outer shape of the display device mounted on the vehicle.

In addition, a part of the housing 28, that is, the tip portion 298a on the front surface side of the front panel 29 protrudes toward the front surface side from the rear surface of the front plate 21, and faces the end surface 214 of the front plate 21. According to this configuration, the housing 28 can protect the end surface 214 having relatively low strength in the front plate 21. Therefore, it is possible to improve the safety of the display device mounted on the vehicle, for example, at the time of rear collision.

Further, the third arc surface 299a is provided on a part of the housing 28 protruding toward the front surface side from the rear surface of the front plate 21, that is, on the tip portion 298a of the front surface side of the front panel 29. Similarly, the fifth arc surface 299b is provided in the tip portion 298b on the rear surface side. According to this configuration, even in a case where the tip portion 298a on the front surface side or the tip portion 298b on the rear surface side of the front panel 29 protrudes from the arc shape of the outer shape due to the component variation or the assembly variation, it is possible to satisfy the legal requirements.

According to the in-vehicle display device of the present disclosure, it is possible to improve the degree of freedom in design.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An in-vehicle display device comprising:
   a front plate in which a first arc surface bulging outward is formed on a front surface side in an outer peripheral edge portion; and
   a housing which supports the front plate from a rear surface side, and in which a second arc surface bulging outward is formed on a side surface side, and a part on the side surface side protrudes toward the front surface side from a rear surface of the front plate, and faces the outer peripheral edge portion of the front plate,
   wherein the housing includes:
      a front panel that has a main body portion in which the second arc surface is formed, and a support portion which extends opposite to the second arc surface from the main body portion, includes a front surface and a rear surface, and supports the front plate; and
      a rear panel which supports the support portion from the rear surface side, and in which a fourth arc surface bulging outward is formed on the rear surface side in the outer peripheral edge portion,
   wherein the front surface of the support portion supports the rear surface of the front plate, and
   wherein the second arc surface and the fourth arc surface are different parts of a common arc surface.

2. The in-vehicle display device according to claim 1, wherein the outer peripheral edge portion of the front plate is provided on the side surface side of a video display range in the front plate.

3. The in-vehicle display device according to claim 1, wherein the first arc surface is a part of the common arc surface.

4. The in-vehicle display device according to claim 1, wherein the outer peripheral edge portion of the front plate and the part on the side surface side in the housing are disposed apart from each other.

5. The in-vehicle display device according to claim 1, wherein a third arc surface bulging outward is formed on a part on the side surface side in the housing, and on the front surface side in the front plate.

6. The in-vehicle display device according to claim 1, wherein an end portion on the rear surface side in the main body portion and the outer peripheral edge portion of the rear panel are disposed apart from each other.

7. The in-vehicle display device according to claim 1, wherein a fifth arc surface bulging outward is formed on an end portion of the main body portion, the end portion being on the rear surface side in the rear panel.

8. The in-vehicle display device according to claim 1, wherein a radius of an arc in which the second arc surface and the fourth arc surface are inscribed is 5 mm or more.

9. The in-vehicle display device according to claim 1, wherein a radius of an arc in which the first arc surface and the second arc surface are inscribed is 5 mm or more.

* * * * *